UNITED STATES PATENT OFFICE.

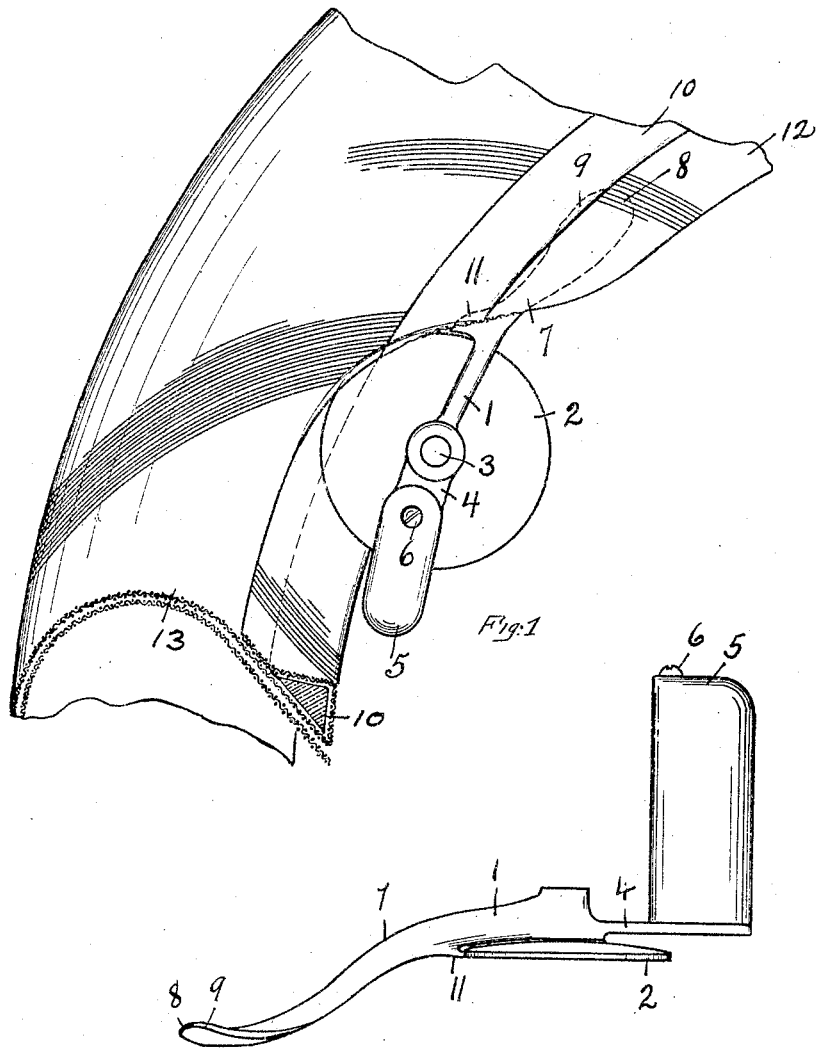

CHARLES W. MORRIS, OF YOUNGSTOWN, OHIO.

TURN-UP TOOL.

1,379,277.      Specification of Letters Patent.      Patented May 24, 1921.

Application filed February 27, 1920. Serial No. 361,625.

*To all whom it may concern:*

Be it known that I, CHARLES W. MORRIS, a citizen of the United States of America, residing at Youngstown, in the county of Mahoning and State of Ohio, have invented certain new and useful Improvements in Turn-Up Tools, of which the following is a specification.

This invention relates to a tool for turning up a fabric ply over a bead in the process of manufacturing auto tires.

The principal object is to provide a main body portion carrying a revolving desk, one end of said body portion carrying an operating handle, or means for attaching to a machine operating the tool when a machine is substituted for the handle. The other end of the tool has a flattened portion having a downward bend having the extreme end bent slightly upward and also slightly twisted so that one side of the extreme end portion dips downward and the other upward.

With these and other objects in view, the invention consists of certain novel combinations, constructions and arrangements of parts as will be hereinafter fully described and claimed.

In the accompanying drawings:

Figure 1 is a top plan view of the device showing the method of applying it to a fabric ply when being turned up over a bead.

Fig. 2 is a side elevation of the device.

The tool comprises of a body portion 1. Underneath this body portion 1 is a revolving disk 2 secured to the body portion 1 by means of a bolt or rivet 3.

Extending from the body portion 1 is an arm 4. At the outer end of this arm, an operating handle 5 is securely attached by means of a bolt 6. It is understood that this handle 5 may be removed and the tool attached to any desired machine to operate it in place of using the above described handle.

By referring to Fig. 2 it will be seen that one end of the tool is provided with a downwardly bent arm 7, the extreme end 8 of said arm 7 being flattened and turned up, the edge 9 of the end 8 being bent slightly upward so that when the tool is in use the edge 9 hooks under the bead 10.

By referring to Fig. 1 it will be seen that the arm 7 is provided with a lip 11 formed on the side of the arm 7 near the circumference of the revolving disk 2.

In operating the device the edge 9 of the arm 7 is placed underneath the bead 10. The tool is then moved up against the bead 10 so that the lip 11 and the rotating disk 2 turn the ply 12 up over the bead 10 and onto the tire 13.

The lip 11 is located on the arm 7, so that the lower surface of the lip 11 is on the same plane as the lower surface of the rotating disk 2.

In this step of the process of manufacturing the ply 12 has a gummed surface which comes in contact with the tire 13 when turned up.

While the tool was invented to do the work above described, it is understood that the tool may be used on other articles in process of manufacture where it is desired to turn up a ply or flap over an edging or bead.

What I claim is:

1. In a device of the class described, a body portion, a rotating disk secured to the underside of same, an arm with an operating handle attached thereon, a flattened downturned arm, a lip formed on the side of said arm, a turned up edge on the end portion of said flattened downturned arm, substantially as described for the purpose set forth.

2. In a device of the class described, the combination of a body portion, a disk secured underneath said body portion, a downwardly extending arm, a turned up edge at the end of said arm, a lip formed on the side of said downwardly extending arm, said lip located near the circumference of above mentioned disk, and having its under surface on practically the same plane as the underside of above mentioned disk.

In testimony whereof I affix my signature.

CHARLES W. MORRIS.

Witnesses:
   A. E. BURKE,
   C. A. HARPMAN.